UNITED STATES PATENT OFFICE.

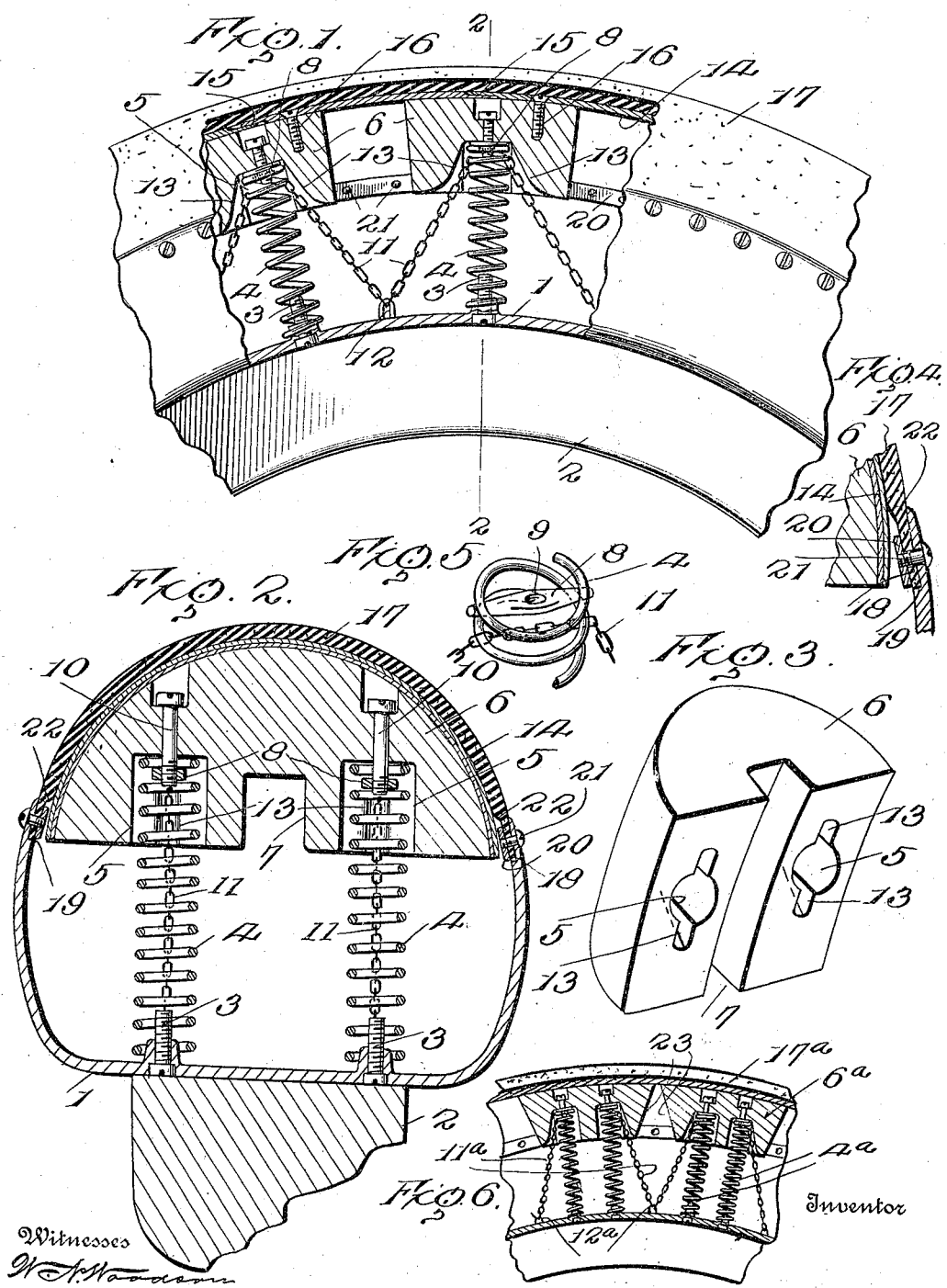

JACOB THISSEN, OF BANGOR, PENNSYLVANIA.

RESILIENT TIRE.

996,299.  Specification of Letters Patent.  Patented June 27, 1911.

Application filed March 22, 1910. Serial No. 551,016.

*To all whom it may concern:*

Be it known that I, JACOB THISSEN, citizen of the United States, residing at Bangor, in the county of Northampton and State of Pennsylvania, have invented certain new and useful Improvements in Resilient Tires, of which the following is a specification.

This invention comprehends certain new and useful improvements in resilient tires, and the invention has for its primary object a simple, durable and efficient construction of tire which will possess substantially all the characteristics that are incidental to the ordinary pneumatic and cushion rubber tires, without the accompanying liability to become punctured and otherwise damaged in service, and capable of being constructed more cheaply than the ordinary tires which embody rubber, or rubber composition to secure the desired resiliency.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a side elevation of a portion of a vehicle wheel embodying the improvements of my invention, a portion being broken away in order to show the interior parts; Fig. 2 is a transverse sectional view on the line 2—2 of Fig. 1; Fig. 3 is an inverted perspective view of one of the blocks employed; Fig. 4 is an enlarged detail section illustrating particularly the connection between the rim and the outer casing or envelop of the tire; Fig. 5 is a perspective view of a portion of one spring and, Fig. 6 is a longitudinal sectional view illustrating a modification hereinafter specifically referred to.

Corresponding and like parts are referred to in the following description and indicated in all the views of the accompanying drawings by the same reference characters.

My improved tire is applicable for use with the wheels of automobiles, auto trucks, or other vehicles generally, and embodies a rim 1 which is preferably channeled as best illustrated in Fig. 2 and which is secured to the felly 2 of the wheel in any desired way, (not shown).

Secured to the bottom of the rim 1 and projecting outwardly therefrom in a radial direction, are any desired number of pins or posts 3, the same being shown in pairs, in the present instance, although it is to be understood that any desired number of these posts may be provided, transversely considered, according to the size or width of the tire of which they form parts. Helical compression springs 4 are intended to be slipped over the posts 3, the outer ends of said springs being received in substantially cylindrical sockets 5 that are formed in the inner surface of the blocks 6 that are composed of any desired substance or material. The blocks 6 are transversely curved on their outer faces, as clearly illustrated in Fig. 2, and they are preferably formed between the sockets 5 with recesses 7 so as to reduce the weight.

In order to secure the outer ends of the springs 4 to the blocks 6, I have, in the present instance, provided crossbars 8, said cross bars being passed through the springs 4 underneath, say, the outermost convolution or coil, each of said crossbars being formed with a screw-threaded aperture 9 as clearly illustrated in the drawing, and screws 10 or similar fastening devices are passed inwardly into the blocks 6 and are preferably counter-sunk therein as shown, the inner threaded ends of the screws working in the threaded apertures 9 so as to securely hold the springs in place. It is to be understood that my invention is not limited to any specific means for securing the springs to the blocks, and that, if desired, no fastening means at all may be provided, the springs being set in the sockets 5 and depending upon such arrangement to prevent the relative displacement of the springs and blocks.

In order to increase the stability of the tire, without detracting from the resiliency thereof, chains 11 are provided. These chains are arranged in two sets or lengths, a pair of chains being located between each pair of springs, the springs here being circumferentially considered. Each chain 11 is connected at one end to the outer ends of the adjoining spring and extends inwardly and obliquely as illustrated in Fig. 1 and is connected at its opposite end to a staple 12 or similar fastening device connected to the bottom of the rim 1. One staple or the like serves as a common fastening element for both chains of every pair of chains. In order to properly guide the chains and at the same time permit them to have the necessary movement relatively to the blocks without chafing, each socket is recessed at diametrically opposite points as best illustrated in Fig. 3 the recesses designated 13 being preferably beveled in a circumferential direction, as shown, and being preferably of slightly greater width than the chains which they are designed to accommodate. The blocks 6 may be of any desired size, and they are arranged in circumferentially extending series with spaces between, the spaces being preferably of equal extent.

Encircling the series of blocks 6 are preferably steel segmental plates 14 arranged end to end with chamfered end edges 15 which slightly overlap as illustrated in Fig. 1 said plates being mounted for a slight circumferentially sliding movement relative to each other as the wheel is compressed in service. In the preferred arrangement of the parts the joints between the chamfered overlapping ends of the segmental plates 14 are disposed about midway of the outer surface of the blocks 6, the plates being of a length to extend from one block to the next, as clearly illustrated in Fig. 1. The plates 14 may be secured to the respective blocks in any desired way. For example, each plate may be secured by screws 16 to one block and lie for a sliding movement upon the surface of the next adjoining block.

Encircling the entire series of segmental plates 14, is an outer casing 17 which may be formed of leather, rubber, or any desired substance or material arranged in desired way and secured to the sides of the rim in any desired way. In the present instance, the side edges of the casing 17 contact with the inner sides of the channeled rim, overlapping said sides to the desired extent and preferably lying within slight recesses 18 formed in the inner walls of the sides, said recesses terminating in outwardly facing shoulders 19 against which the edges of the casing abut. These side edges are further interposed between the rim and packing rings 20 which may be formed of any desired material and which are formed with screw threaded openings, screws 21 or the like being passed inwardly through the rim and openings formed in the casing and working in the threaded opening of the rings 20 so as to securely hold the parts together and produce a joint which will exclude water and dust. Preferably, the inner surface of the casing 17 at the attached edges thereof is compressed or beveled, as indicated at 22 so as to provide proper clearance for the innermost edges of the transversely curved segmental plates 14 which manifestly will move inwardly or toward the center of the wheel when an inward stress, shock or compression is imposed thereon.

From the foregoing description in connection with the accompanying drawing, it will be understood that any stress or shock which is received by a wheel equipped with my invention will be taken up and absorbed by the springs 4 and that the chains 11 will give the tire stability and prevent the parts from becoming separated or disjointed, and that the blocks 6 and segmental plates 14 will effectually prevent the inner parts of the tire from injury without detracting from the resiliency thereof, the whole structure being durable and light and not liable to get out of order.

It is to be understood that my invention is not limited to the exact construction, arrangement and proportion of the parts herein described and shown, but that various changes may be made without departing from the scope of the invention as defined in the appended claims. For instance, reference is to be had to Fig. 6, wherein a modification is shown which dispenses with the use of the segmental plates 14. In this embodiment of the invention, the blocks, designated $6^a$ are preferably set closer together and may have beveled end edges 23, and the leather or other casing $17^a$ may be placed directly around the series of blocks. Any desired number of springs $4^a$ may be employed in this modification, for instance, four springs for each block, and the chains $11^a$ may be connected at one end to a common staple $12^a$ or other fastening and at their other ends to sundry of the springs.

Having thus described the invention, what is claim as new is:

1. A tire embodying a rim, compression springs mounted in said rim and projecting outwardly therefrom in a radial direction, blocks secured upon the outer ends of said springs and arranged in a circumferentially extending series with spaces between, a plurality of segmental plates encircling the blocks, the plates being secured at one end to the respective blocks, and overlapping the ends of the adjacent block, and the ends of said plates being chamfered and overlapping each other for a slight circumferential movement, and a casing surrounding said plates and secured to the rim.

2. A tire, embodying a rim, compression springs mounted in the rim, blocks formed with sockets receiving the outer ends of said springs, cross bars passed through the outer ends of said springs and formed with threaded apertures, fastening devices extending into the sockets and engaging the threaded apertures of the bars whereby to fasten the springs and blocks, segmental plates encircling the series of blocks, and a casing surrounding the said plates and secured to the rim.

3. A tire embodying a rim, compression springs mounted in the rim, blocks formed with sockets receiving the outer ends of the springs, cross bars passed through the outer ends of said springs and formed with threaded apertures, fastening devices countersunk in said blocks and extending into the sockets and engaging the threaded apertures of the cross bars, whereby to fasten the springs upon the blocks, chains connected to the springs at the outer ends thereof and extending inwardly and obliquely and connected at their inner ends to the rim, and a casing encircling the blocks and secured to the rim.

In testimony whereof, I affix my signature in presence of two witnesses.

JACOB THISSEN. [L. S.]

Witnesses:
　GEO. S. LIVINGSTON,
　FREDERICK STITT.